US010725890B1

(12) United States Patent
Goyal et al.

(10) Patent No.: US 10,725,890 B1
(45) Date of Patent: Jul. 28, 2020

(54) PROGRAM TESTING SERVICE

(71) Applicant: Amazon Technologies, Inc., Seattle, WA (US)

(72) Inventors: Anurag Goyal, Seattle, WA (US); Hongda Zhao, Sammamish, WA (US); Billy Morales, Seattle, WA (US); Bommasamudra Chandra Shekar, Redmond, WA (US); Rohan Deshpande, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/648,199

(22) Filed: Jul. 12, 2017

(51) Int. Cl.
*G06F 11/36* (2006.01)
*H04L 29/06* (2006.01)
(Continued)

(52) U.S. Cl.
CPC ...... *G06F 11/3656* (2013.01); *G06F 11/3664* (2013.01); *G06F 11/3688* (2013.01);
(Continued)

(58) Field of Classification Search
CPC ............. G06F 9/45558; G06F 11/3656; G06F 11/3664; G06F 11/3688; G06F 2009/45562; H04L 43/50; H04L 63/029; H04L 67/141
(Continued)

(56) References Cited

U.S. PATENT DOCUMENTS 5,845,090 A   12/1998 Collins, III et al.
5,892,949 A   4/1999 Noble
(Continued)

FOREIGN PATENT DOCUMENTS

WO   WO2011085335   7/2011
WO   WO2012027886   3/2012

OTHER PUBLICATIONS

Takahiro Hirofuchi, Eiji Kawai, Kazutoshi Fujikawa, and Hideki Sunahara, USB/IP—a Peripheral Bus Extension for Device Sharing over IP Network, Apr. 10-15, 2005, USENIX Association, 17 pages. (Year: 2005).*

(Continued)

*Primary Examiner* — Andrew M. Lyons
(74) *Attorney, Agent, or Firm* — Lee & Hayes, P.C.

(57) ABSTRACT

A device to be utilized for testing a program is connected to a device host operating in a service provider network via a peripheral bus. A network connection is established between a testing host, which might be a virtual machine, and the device host using a peripheral-bus-over-network-protocol. A secure network connection is established between the developer computing device and the testing host. A network port utilized by a debugging client application executing on the developer computing device is forwarded to the testing host over the secure network connection. Data packets generated by the debugging client application executing on the developer computing device are forwarded to a debugging server application execution on the testing host. Peripheral devices (e.g. the requested device) accessible to the testing host can then be utilized by the developer computing device for testing execution of the program as if the device were locally connected thereto.

20 Claims, 7 Drawing Sheets

(51) Int. Cl.
*H04L 29/08* (2006.01)
*H04L 12/26* (2006.01)
*G06F 9/455* (2018.01)

(52) U.S. Cl.
CPC ............ *H04L 43/50* (2013.01); *H04L 63/029* (2013.01); *H04L 67/141* (2013.01); *G06F 9/45558* (2013.01); *G06F 2009/45562* (2013.01)

(58) Field of Classification Search
USPC .................................................. 717/124–135
See application file for complete search history.

(56) References Cited

U.S. PATENT DOCUMENTS

| | | |
|---|---|---|
| 5,911,041 A | 6/1999 | Schaffer |
| 5,930,707 A | 7/1999 | Vambaris et al. |
| 6,047,389 A | 4/2000 | Thai |
| 6,112,020 A | 8/2000 | Wright |
| 6,138,153 A | 10/2000 | Collins, III et al. |
| 6,195,765 B1 | 2/2001 | Kislanko et al. |
| 6,526,526 B1 | 2/2003 | Dong et al. |
| 6,618,854 B1 | 9/2003 | Mann |
| 6,928,481 B1 | 8/2005 | Harris et al. |
| 6,931,575 B2 | 8/2005 | Smith et al. |
| 7,000,224 B1 | 2/2006 | Osborne, II et al. |
| 7,006,445 B1 | 2/2006 | Cole et al. |
| 7,010,782 B2 | 3/2006 | Narayan et al. |
| 7,146,542 B2 | 12/2006 | Srinivasan et al. |
| 7,159,021 B2 | 1/2007 | Boldman et al. |
| 7,191,363 B2 | 3/2007 | Chang |
| 7,219,030 B2 | 5/2007 | Ohtani |
| 7,266,818 B2 | 9/2007 | Pike et al. |
| 7,299,451 B2 | 11/2007 | Dygon et al. |
| 7,301,660 B2 | 11/2007 | Jamison et al. |
| 7,334,162 B1 | 2/2008 | Vakrat et al. |
| 7,343,586 B1 | 3/2008 | Hernandez, III |
| 7,350,194 B1 * | 3/2008 | Alpern ................. G06F 11/362 714/E11.207 |
| 7,412,625 B2 | 8/2008 | Shankar et al. |
| 7,519,864 B2 | 4/2009 | Alam et al. |
| 7,535,847 B1 | 5/2009 | Hansen et al. |
| 7,546,584 B2 | 6/2009 | Rovang |
| 7,617,224 B2 | 11/2009 | Moulckers et al. |
| 7,703,103 B2 | 4/2010 | Spiegl et al. |
| 7,739,680 B1 | 6/2010 | Thakur et al. |
| 7,760,769 B1 | 7/2010 | Lovett et al. |
| 7,890,990 B1 | 2/2011 | Vainstein et al. |
| 7,908,590 B1 | 3/2011 | Min et al. |
| 7,945,899 B2 | 5/2011 | Rovang |
| 8,185,910 B2 | 5/2012 | Swildens |
| 8,191,048 B2 | 5/2012 | Parthasarathy et al. |
| 8,254,908 B2 | 8/2012 | Lee |
| 8,255,877 B2 | 8/2012 | Vong et al. |
| 8,315,655 B1 | 11/2012 | Cole |
| 8,352,903 B1 | 1/2013 | Friedman |
| 8,375,013 B2 | 2/2013 | Snyder |
| 8,458,695 B2 | 6/2013 | Fitzgerald et al. |
| 8,479,154 B1 | 7/2013 | Friedman |
| 8,539,435 B1 | 9/2013 | Rovang |
| 8,543,932 B2 | 9/2013 | Fields et al. |
| 8,601,484 B2 | 12/2013 | Salsbery et al. |
| 8,612,933 B1 | 12/2013 | Gill et al. |
| 8,615,755 B2 | 12/2013 | Gargash et al. |
| 8,732,722 B2 | 5/2014 | Swildens |
| 8,737,980 B2 | 5/2014 | Doshi et al. |
| 8,745,617 B1 | 6/2014 | Stekkelpak et al. |
| 8,745,734 B1 * | 6/2014 | Brandwine ......... H04L 63/1408 726/22 |
| 8,769,102 B1 * | 7/2014 | Zhou ................... G06F 11/3696 709/223 |
| 8,769,340 B2 | 7/2014 | Li et al. |
| 8,788,885 B1 | 7/2014 | Cook et al. |
| 8,893,106 B2 | 11/2014 | Ningombam et al. |
| 8,910,294 B1 * | 12/2014 | Sennett ............... H04L 63/1433 726/25 |
| 8,990,768 B2 | 3/2015 | Kowal |
| 8,990,813 B2 * | 3/2015 | Frields ................ G06F 11/3672 709/223 |
| 9,170,922 B1 * | 10/2015 | Lachwani ........... G06F 11/3636 |
| 9,268,670 B1 * | 2/2016 | Lachwani ........... G06F 11/3684 |
| 9,292,423 B1 * | 3/2016 | Doshi ................. G06F 11/3664 |
| 9,588,799 B1 * | 3/2017 | Burruss .............. G06F 9/45558 |
| 9,679,090 B1 * | 6/2017 | Marolia .............. G06F 11/3688 |
| 9,684,579 B1 * | 6/2017 | Adams ................ G06F 11/261 |
| 9,774,612 B2 * | 9/2017 | Brandwine ......... H04L 63/1408 |
| 9,811,415 B2 * | 11/2017 | Chu .................... G06F 11/1068 |
| 9,811,451 B1 * | 11/2017 | Arguelles ........... G06F 11/3688 |
| 9,832,802 B2 * | 11/2017 | Kreiner .............. H04W 72/048 |
| 9,928,151 B1 * | 3/2018 | Rodriguez Valadez ..................... G06F 11/26 |
| 2002/0188941 A1 | 12/2002 | Cicciarelli et al. |
| 2003/0005427 A1 | 1/2003 | Herrero |
| 2003/0023900 A1 * | 1/2003 | Smith ................. G06F 11/2294 714/25 |
| 2003/0163807 A1 | 8/2003 | Drake et al. |
| 2004/0107415 A1 | 6/2004 | Melamed et al. |
| 2004/0123188 A1 | 6/2004 | Srinivasan et al. |
| 2004/0165210 A1 | 8/2004 | Jamison et al. |
| 2004/0194064 A1 | 9/2004 | Ranjan et al. |
| 2004/0199571 A1 | 10/2004 | Spiegl et al. |
| 2004/0205406 A1 | 10/2004 | Kaliappan et al. |
| 2004/0229606 A1 * | 11/2004 | Oshima ............... H04L 63/0428 455/426.2 |
| 2004/0243883 A1 | 12/2004 | Shankar et al. |
| 2004/0255276 A1 | 12/2004 | Rovang |
| 2005/0120335 A1 * | 6/2005 | Kelley ..................... G06F 8/20 717/121 |
| 2005/0223362 A1 | 10/2005 | Whitlock et al. |
| 2006/0059253 A1 | 3/2006 | Goodman et al. |
| 2006/0271322 A1 | 11/2006 | Haggerty |
| 2007/0140135 A1 | 6/2007 | Sheppard |
| 2007/0245313 A1 | 10/2007 | Hardy et al. |
| 2007/0288552 A1 | 12/2007 | Snyder |
| 2008/0139195 A1 * | 6/2008 | Marsyla ................ H04W 24/10 455/423 |
| 2008/0155343 A1 | 6/2008 | Branca et al. |
| 2008/0181123 A1 | 7/2008 | Huang et al. |
| 2008/0222608 A1 | 9/2008 | Gartner et al. |
| 2008/0294383 A1 | 11/2008 | Parmar et al. |
| 2009/0036111 A1 * | 2/2009 | Danford .............. H04L 41/0893 455/419 |
| 2009/0207743 A1 | 8/2009 | Huq et al. |
| 2009/0222795 A1 * | 9/2009 | Frank ........................ G06F 8/44 717/127 |
| 2009/0235122 A1 | 9/2009 | Rovang |
| 2009/0249297 A1 | 10/2009 | Doshi et al. |
| 2009/0296590 A1 * | 12/2009 | Joyner ................. H04L 41/145 370/250 |
| 2009/0300603 A1 | 12/2009 | Schneider |
| 2009/0307763 A1 | 12/2009 | Rawlins et al. |
| 2010/0077079 A1 * | 3/2010 | Xu ...................... G06F 11/2294 709/226 |
| 2010/0131928 A1 | 5/2010 | Parthasarathy et al. |
| 2010/0153055 A1 | 6/2010 | Mucha et al. |
| 2010/0162201 A1 | 6/2010 | Shnaiderman et al. |
| 2010/0275061 A1 * | 10/2010 | Lee .................... G06F 11/2294 714/27 |
| 2010/0313185 A1 * | 12/2010 | Gupta ................. G06F 11/2294 714/27 |
| 2011/0028145 A1 | 2/2011 | Marsyla et al. |
| 2011/0072306 A1 | 3/2011 | Racey et al. |
| 2011/0265020 A1 | 10/2011 | Fields et al. |
| 2012/0023485 A1 | 1/2012 | Dubey et al. |
| 2012/0030658 A1 | 2/2012 | Hu et al. |
| 2012/0084757 A1 * | 4/2012 | Tamiya ................. G06F 11/362 717/124 |
| 2012/0089871 A1 | 4/2012 | Sun |
| 2012/0151455 A1 * | 6/2012 | Tsantilis ............. G06F 11/3688 717/132 |
| 2012/0198279 A1 | 8/2012 | Schroeder |
| 2012/0210306 A1 | 8/2012 | Tucker et al. |

(56) References Cited

U.S. PATENT DOCUMENTS

| | | | | |
|---|---|---|---|---|
| 2012/0250682 | A1* | 10/2012 | Vincent | H04L 12/4633 370/390 |
| 2012/0300649 | A1* | 11/2012 | Parmar | H04L 43/0888 370/252 |
| 2012/0311157 | A1* | 12/2012 | Erickson | G06F 9/541 709/226 |
| 2013/0024842 | A1 | 1/2013 | Browne et al. | |
| 2013/0078983 | A1 | 3/2013 | Doshi et al. | |
| 2013/0173964 | A1 | 7/2013 | Okano | |
| 2014/0125271 | A1 | 5/2014 | Wang | |
| 2014/0173565 | A1* | 6/2014 | Scholl | G06F 11/3664 717/124 |
| 2014/0245289 | A1* | 8/2014 | Marks | G06F 11/3664 717/176 |
| 2014/0245290 | A1 | 8/2014 | Gupta et al. | |
| 2014/0331090 | A1* | 11/2014 | Mohindra | G06F 11/362 714/37 |
| 2014/0331209 | A1* | 11/2014 | Singh | G06F 11/3688 717/127 |
| 2015/0033078 | A1* | 1/2015 | Wintergerst | G06F 11/362 714/38.1 |
| 2015/0033205 | A1* | 1/2015 | Wintergerst | G06F 11/362 717/124 |
| 2015/0161022 | A1* | 6/2015 | Bragstad | G06F 11/362 717/129 |
| 2015/0161023 | A1* | 6/2015 | Bragstad | G06F 11/362 717/129 |
| 2016/0142914 | A1* | 5/2016 | He | H04L 67/34 726/12 |
| 2016/0162389 | A1* | 6/2016 | Lachwani | G06F 11/3664 714/38.14 |
| 2016/0170472 | A1* | 6/2016 | Cosaro | G06F 1/3287 710/104 |
| 2016/0283352 | A1* | 9/2016 | Kraus | G06F 3/0482 |
| 2017/0262130 | A1* | 9/2017 | Lloyd | G06F 11/3688 |

OTHER PUBLICATIONS

Rodriguez, Carlos, "Communicating with your iOS app over USB (C# and/or Xamarin)," The Code Wash, May 24, 2017, last retrieved from thecodewash.blogspot.com/2017/05/communicating-with-your-ios-app-over.html on Mar. 18, 2019 (Year: 2017).*

V. Autefage, D. Magoni and J. Murphy, "Virtualization Toolset for Emulating Mobile Devices and Networks," 2016 IEEE/ACM International Conference on Mobile Software Engineering and Systems (MOBILESoft), Austin, TX, 2016, pp. 245-254. (Year: 2016).*

C. Serban, A. Poylisher and J. Chiang, "Virtual ad hoc network testbeds for network-aware applications," 2010 IEEE Network Operations and Management Symposium—NOMS 2010, Osaka, 2010, pp. 432-439. (Year: 2010).*

C. Tao, J. Gao and B. Li, "Cloud-Based Infrastructure for Mobile Testing as a Service," 2015 Third International Conference on Advanced Cloud and Big Data, Yangzhou, 2015, pp. 133-140. (Year: 2015).*

S. van der Burg and E. Dolstra, "Automating System Tests Using Declarative Virtual Machines," 2010 IEEE 21st International Symposium on Software Reliability Engineering, San Jose, CA, 2010, pp. 181-190. (Year: 2010).*

USB/IP Project,—USB Request Over IP Network, http://usbip.sourceforge.net/ (5 pages).

"About Remote Test Lab", Samsung Developers, retrieved from Internet Archive Waybackmachine, http://developer.samsung.cin.remotetestlab/rtlAboutRTL.action,2012, 2 pages.

Canadian Office Action dated Sep. 15, 2016 for Canadian patent application No. 2910977, a counterpart foreign application of U.S. Appl. No. 13/875,945, 6 pages.

Extended European Search Report dated Oct. 20, 2016 for European application No. 14791080.6, (8 pages).

Fukuda, "Smartphones for testing are available in clouds: Accenture and Sonix offer new services", Nikkei Computure, No. 816, p. 11, Nikkei BP, Aug. 30, 2012 (6 pages).

"Help—SAMSUNG Developers—Chapter 1. Getting Started", retrieved at http://developer.samsung.com/remotetestlab/rtlHelpDevice.action , 3 pages.

Japanese Office Action dated Nov. 29, 2016 for Japanese Patent Application No. 2016-512074, a counterpart foreign application of U.S Appl. No. 13/875,945, (8 pages).

English-language translation of Official Notice of Rejection dated May 30, 2017 by the Japan Patent Office in corresponding Application No. JP-2016-512074, 8 pages.

Mackenzie, "Remote test your Android apps with these services", Software Engineer, Dec. 4, 2012, 8 pages.

Office Action for U.S. Appl. No. 13/875,945 dated Oct. 2, 2015, Singh, "Program Testing Service", 15 pages.

Office Action for U.S. Appl. No. 13/875,955 dated Nov. 17, 2015, Singh, "Program Testing Service", 14 pages.

Office Action for U.S. Appl. No. 13/875,945, dated Dec. 29, 2016, Singh, "Program Testing Service", 17 pages.

Office Action for U.S. Appl. No. 13/875,955, dated Dec. 29, 2016, Singh, "Program Testing Service", 17 pages.

Final Office Action for U.S. Appl. No. 13/875,945, dated May 7, 2015, Lokendra Singh, "Program Testing Service", 16 pages.

Office Action for U.S. Appl. No. 13/875,945, dated Jun. 13, 2016, Singh, "Program Testing Service", 17 pages.

Office Action for U.S. Appl. No. 13/875,955, dated Jun. 13, 2016, Singh, "Program Testing Service", 16 pages.

Final Office Action for U.S. Appl. No. 13/875,945, dated Jun. 30, 2017, Lokendra Singh, "Program Testing Service", 14 pages.

Final Office Action for U.S. Appl. No. 13/875,955, dated Jun. 4, 2015, Lokendra Singh, "Program Testing Service", 16 pages.

Office Action for U.S. Appl. No. 13/875,955, dated Sep. 11, 2014, Singh, "Program Testing Service", 15 pages.

Office Action for U.S. Appl. No. 13/875,945, dated Sep. 9, 2014, Singh, "Program Testing Service", 16 pages.

PCT Search Report and Written Opinion dated Sep. 25, 2014 for PCT application No. PCT/US2014/36640, 7 pages.

"Remote Test Lab Help", chapters 1-4, Samsun Developers, retrieved from http://developer.samsung.cin/remotetestlab/rtlHelpDevice.action on Jun. 22, 2017, pp. 1-13.

* cited by examiner

PROGRAM TESTING SERVICE

BACKGROUND

The number of available models of smartphones and tablet computing devices has grown exponentially during the last few years. For example, in the last several years, the number of available smartphone models has grown significantly. Similar growth has also occurred in the number of available models of tablet devices. Other types of mobile computing devices have also shown significant growth.

The various models of smartphones, tablets, and other mobile computing devices described above frequently have different hardware configurations, even when the devices are configured to execute the same operating system. For example, different smartphone models that utilize the same operating system might include different processors, different amounts of memory, and different peripheral devices, such as cameras, global positioning system ("GPS") sensors, and others. These devices might also include significant variations in software configurations. For example, some models might be configured with different versions of the same operating system and/or with different software installed on the devices by the manufacturers of the devices.

Systems exist that allow programs to be tested on a variety of network-accessible computing devices. However, these systems are limited in the number of program testing frameworks that they can support. As a result, software developers commonly utilize these types of testing systems only late in the program development lifecycle. Moreover, because these systems limit the number of testing frameworks that can be utilized, programs might not be tested as thoroughly as if the devices used for testing were connected directly to a developer computing device where more program testing frameworks can be utilized. As a result, a program tested by a developer using previous network-based device testing systems might not execute optimally on all devices upon which it is executed. A program that does not execute optimally can unnecessarily consume significant computing resources such as, but not limited to, processor cycles, memory, mass storage, and battery power.

The disclosure made herein is presented with respect to these and other considerations.

DETAILED DESCRIPTION

Figure 1A:
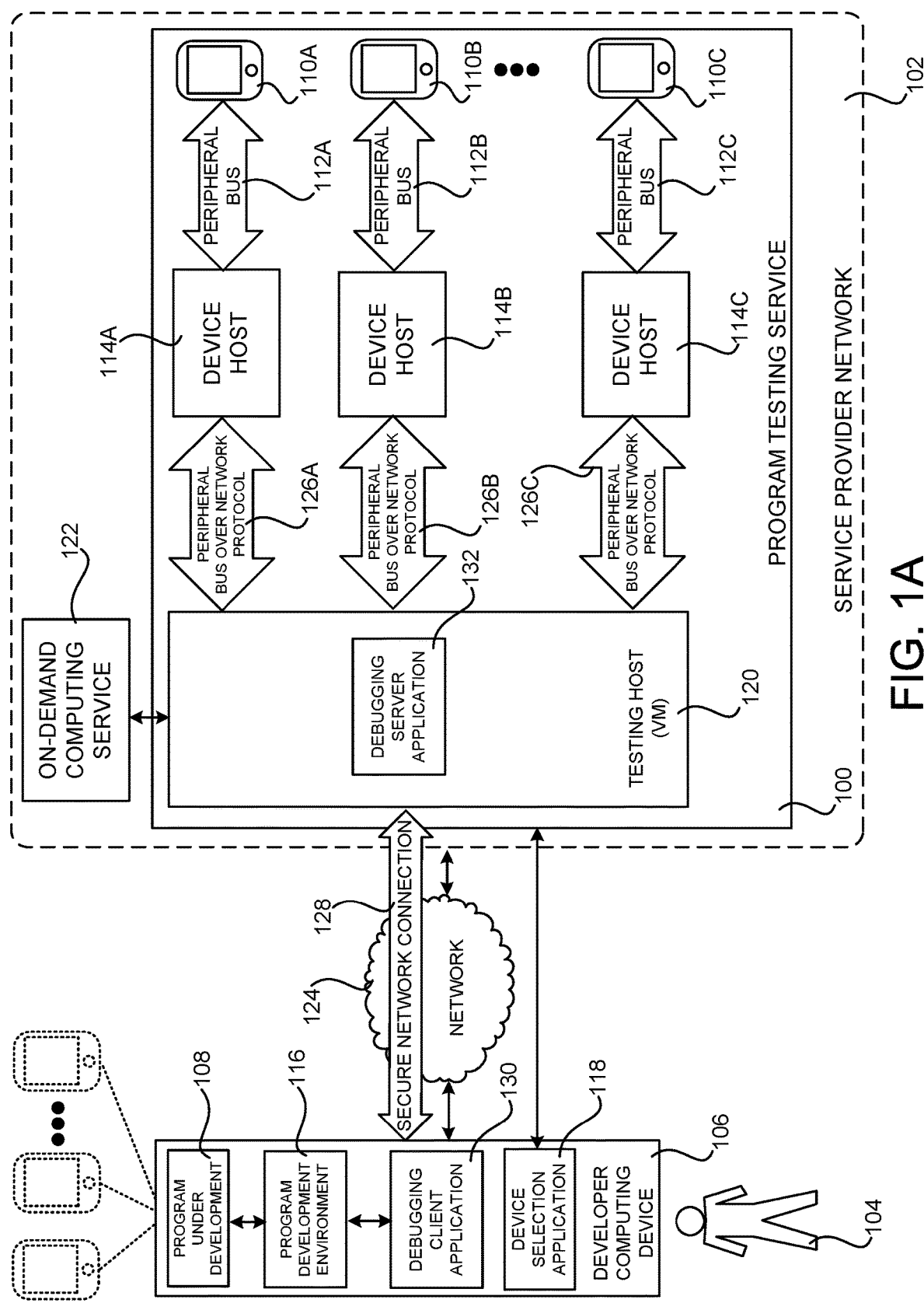
FIG. 1A is a system architecture diagram showing aspects of the configuration and operation of a program testing service, according to one embodiment.

The following detailed description is directed to technologies for testing program execution on remotely located computing devices as if the devices were connected locally to a developer computing device. More particularly, program execution can be tested on devices operating in a distributed computing environment as if the devices are locally connected to a developer computing device. This allows the program to be tested on many different devices utilizing any testing framework that can be utilized locally on a developer computing device without requiring that a developer own the devices.

Using the disclosed mechanisms, program execution can be tested and optimized more thoroughly throughout the program development lifecycle. Consequently, program execution can be optimized, thereby resulting in savings in the utilization of various types of computing resources such as, but not limited to, processor cycles, memory usage and mass storage usage. Additionally, savings in power consumption can also be realized because programs tested using the disclosed program testing service can utilize computing resources more efficiently. The disclosed technologies can also provide additional technical benefits not specifically identified herein.

In order to provide the disclosed functionality, a network-based program testing service is disclosed. The network-based program testing service provides functionality for permitting developers to test the execution of programs on a wide variety of physical computing devices, such as smartphones and tablet devices. Although the devices are physically operating within a service provider network, testing frameworks can test the execution of the program on the devices as if the devices are connected directly to a developer computing device. Through the use of such a program testing service, a developer can quickly, easily and economically test the operation of a program on many physical computing devices, using many different testing frameworks. Through this type of testing, the developer may optimize the performance of their program and, thereby, conserve the utilization of computing resources.

According to one aspect presented herein, a computer-implemented mechanism is disclosed for providing and utilizing a network-based program testing service. According to one embodiment, a service provider operates a service provider network that includes device hosts that have various computing devices connected thereto. For example, device hosts operating in the service provider network might have one or more smartphones, tablet computing devices, or other types of mobile computing devices connected thereto.

As an example, a device host in the service provider network might have a smartphone connected thereto by way of a local peripheral bus, such as the Universal Serial Bus ("USB") bus. Other types of peripheral busses can also be utilized to connect device hosts to computing devices that are to be utilized for program testing. The devices connected to the device hosts can have different hardware and/or software configurations. Other types of devices might also be connected to the device hosts in other embodiments.

An application executing on a developer computing device can provide a user interface ("UI") for allowing a developer to select from a list of the devices available from the service provider network for use in testing the operation of their program. Once the developer has selected one or more computing devices to be used for testing, the device selection application, or another component executing on the developer computing device, transmits a request to utilize a device for program testing to the program testing service.

When the program testing service receives the request for a device, the program testing service can determine whether the requested computing device is currently available for use (e.g. not in use testing another program). If the requested device is not available for use, the program testing service can cause the device request to be queued until such time as the requested device becomes available.

If the requested device is available for use, a testing host, which is implemented as a virtual machine instance ("VM") in some embodiments, can establish a network connection with the device host to which the requested device is connected. The connection between the testing host and the device host can be established using a peripheral-bus-over-network-protocol such as, but not limited to, USB-Over-IP ("USB/IP"). Such a network connection encapsulates peripheral bus messages (e.g. USB I/O messages) into network payloads (e.g. TCP/IP payloads) and transmits them between the testing host and the device host. This allows the requested device to appear as if it is locally connected to the testing host, even though the requested device is physically connected to the device host.

The device selection application, or another component executing on the developer computing device, can also establish a secure network connection with the testing host. For example, and without limitation, a secure shell ("SSH") tunnel can be established between the developer computing device and the testing host. A network port utilized by a debugging client application executing on the developer computing device is then forwarded to the testing host over the secure network connection. In this manner, data packets generated by the debugging client application executing on the developer computing device can be forwarded to a debugging server application executing on the testing host.

Through this configuration, peripheral devices accessible to the testing host (e.g. the requested device, which is physically connected to the device host) can be utilized by the developer computing device for testing execution of the program as if it was locally connected thereto. A program development environment can then be utilized to cause testing frameworks to test the execution of the program on the requested device. The output of the testing can be utilized for debugging the operation of the program and, potentially, for other purposes.

Screen output generated by the requested device can also be transmitted to the developer computing device and displayed. Input (e.g. touch input) can also be made to the device by way of the developer computing device and forwarded to the device for execution. Additional details regarding the various components and processes described briefly above for program testing will be presented below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the embodiments described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which might be referred to herein as a "FIG." or "FIGS.").

FIG. 1A is a system architecture diagram showing aspects of the configuration and operation of a program testing service 100 (which might be referred to herein as the "network service 100" or, simply, as the "service 100") for testing the operation of a program 108 (which might be referred to herein as a "program under development 108"), according to one embodiment disclosed herein. As shown in FIG. 1A, a developer 104 can utilize an appropriate developer computing device 106 to execute a program development environment 116.

As known in the art, a program development environment 116 is an environment that allows a user to create, compile, execute, and test programs, such as the program 108. For example, in one illustrative embodiment disclosed herein, the program development environment 116 is the ECLIPSE integrated development environment ("IDE") from the ECLIPSE FOUNDATION. It should be appreciated, however, that other IDEs and other types of program development environments 116 from other vendors might also be utilized with the mechanisms disclosed herein.

In this regard, it should be appreciated that while the embodiments described herein are primarily presented in the context of testing a program 108 on computing devices 110 utilizing the ANDROID or IOS operating systems, the embodiments presented herein are not limited to use with such devices. For example, the embodiments disclosed herein might be utilized to test a program 108 on devices 110 executing other types of operating systems from other entities.

In one implementation, the program 108 is an executable or interpreted program configured for executing on one or more of the devices 110, such as a smartphone, a tablet computing device, an e-reader device, or another type of computing device. In this regard, it should be appreciated that while the embodiments disclosed herein are primarily presented in the context of smartphone computing devices, the embodiments disclosed herein might also be utilized to test execution of the program 108 on other types of devices 110. For example, and without limitation, the embodiments disclosed herein might be utilized with video game devices, set-top box devices, and other types of computing devices. The embodiments disclosed herein should not be construed as being limited to a smartphone device or a device 110 from a particular manufacturer.

In order to test the operation of the program 108 with a variety of computing devices 110, the developer 104 might establish a connection between the developer computing device 106 and a service provider network 102 by way of a network 124. As will be described in greater detail below, the service provider network 102 is operated by a service provider, and is configured to provide a network-based service 100 for testing a program (in addition to other functionality), such as the program 108, on a variety of computing devices 110A-110C (which might be referred to herein as "testing devices 110" or, simply, "devices 110").

The developer computing device 106 might connect to the service provider network 102 through an appropriate network 124, such as the Internet. It should be appreciated that the network topology illustrated in FIG. 1A and the other FIGS. is merely illustrative, and that many more networks, networking devices, computing systems, and software components might be utilized to implement the various embodiments disclosed herein than shown in the FIGS.

As illustrated in FIG. 1A, the computing devices 110A-110C that can be utilized by the developer 104 for testing execution of the program 108 are connected to device hosts 114A-114C, respectively. The device hosts 114A-114C are computers that operate in the service provider network 102. The device hosts 114A-114C include a network interface for communicating with other computing systems in the service provider network 102 by way of a suitable network connection.

The device hosts 114A-114C also include at least one local peripheral bus interface 112A-112C, respectively, such as the USB peripheral bus. The devices 110A-110C are connected to the device hosts 114A-114C by way of the local peripheral bus 112A-112C, respectively. In this regard, it is to be appreciated that while the embodiments disclosed herein are primarily presented in the context of the USB peripheral bus, other peripheral busses can be utilized in other embodiments. Such busses include, but are not limited to, the FIREWIRE peripheral bus. It is to be further appreciated that each device host 114 is connected to only a single device 110 in the embodiment shown in FIG. 1A. In other embodiments, however, multiple devices 110 can be simultaneously connected to each device host 114.

In order to test execution of the program 108 on a device 110, a device selection application 118 can be executed on the developer computing device 106. The device selection application 118 allows the developer 104 to select one or more computing devices 110 within the service provider network 102 that are to be utilized for testing the operation of the program 108.

For example, in various embodiments, a list of available devices 110 might be presented to the developer 104 in a graphical UI, or in another manner. In other implementations, the particular device 110, or devices 110, upon which the program 108 is to be tested might be selected through an analysis of the program 108. For example, if the program 108 has been created for use with a particular operating system or device type, this information might be utilized to select the device 110, or devices 110, upon which the program 108 is to be tested.

According to various embodiments, the developer 104 can select the specific device 110, or devices 110 that the developer 104 would like the program 108 to be tested upon. The developer 104 might also be permitted to select the devices 110 to be used for testing the program 108 by the operating system version that the devices 110 are executing. In other implementations, the developer 104 might also be permitted to select devices 110 for testing based upon the type of hardware, software, or other aspects of the devices 110.

For example, the developer 104 might request that the program 108 be tested on devices having a camera and a particular version of the ANDROID operating system. In this regard, it should be appreciated that a developer 104 might be permitted to select devices 110 for use in testing the program 108 based upon one or more of, a device manufacturer, a device type, a device version, device hardware, operating system version, other software version, or other attributes of a device 110.

Once the developer 104 has selected the devices 110 upon which the program 108 should be tested, the device selection application 118 can transmit a device request (not shown in FIG. 1A) to the program testing service 100. The test request includes, among other things, data identifying the device 110, or devices 110, that are requested for testing the program 108. The device request 110 might be provided to the program testing service 100 in other ways in other implementations (e.g. through a console application, a command line interface, or a web site).

In response to receiving a device request, various components within the service provider network 102 are configured to cause the requested devices 110 to appear as if they are locally connected (e.g. by a peripheral bus like USB) to the developer computing device 106. In particular, in response to receiving a test request, the program testing service 100 (or another component) determines whether the devices 110 requested in the test request are available for use in testing the program 108. If the requested computing devices 110 are not available (e.g. are already in use by another developer), the program testing service 100 can queue the test request until the requested computing devices 110 become available for use.

If the requested computing device 110 is available, a testing host 120 can be instantiated in the service provider network 102. The testing host 120 is a virtual machine instance 120 ("VM") in one embodiment. In this embodiment, an on-demand computing service 122, also operating within the service provider network 102, instantiates the VM. The on-demand computing service 122 can provide computing resources, such as VM instances, on-demand and in response to requests from other services, such as the program testing service 100, operating in the service provider network 102. The testing host 120 can be a hardware device in other configurations. Instantiation is not necessary when the testing host 120 is a hardware computing device.

A network connection 126 is then established between the testing host 120 and the device host 114 to which the requested device 110 is connected by way of the peripheral bus 112. For example, and without limitation, if the device 110A is requested for use in testing the program 108, a network connection 126A will be established between the testing host 120 and the device host 114A.

The network connection 126 between the testing host 120 and a device host 114 utilizes a peripheral-bus-over-network-protocol in some embodiments. For example, and without limitation, the USB-Over-IP ("USB/IP") protocol is utilized on the network connection 126 in some embodiments. Such a network connection 126 encapsulates peripheral bus messages (e.g. USB I/O messages) into network payloads (e.g. TCP/IP payloads) and transmits the payloads between the testing host 120 and the device host 114. This allows the requested device 110 to appear as if it is locally connected to the testing host 120, even though the requested device 110 is physically connected to the device host 114 by way of a peripheral bus 112.

The device selection application 118, or another component executing on the developer computing device 106, can also establish a secure network connection 128 with the testing host 120. For example, and without limitation, a secure shell ("SSH") tunnel can be established between the developer computing device 106 and the testing host 120.

A network port utilized by a debugging client application 130 executing on the developer computing device 106 is then forwarded to the testing host 120 over the secure network connection 128. A debugging service application 132 receives communications from the debugging client application 130.

The debugging client application 130 provides a mechanism for interacting with a locally connected computing device 110. In one particular implementation, the debugging client application 130 is an ANDROID Debug Bridge ("ADB") client and the debugging server application 130 is an ADB server. ADB is utilized when the computing devices 110A-110C are configured with the ANDROID OPERATING SYSTEM. In another implementation, the debugging client application 130 is a USBMUXD socket and the debugging server application 130 is a USBMUXD socket. A USBMUXD socket is used when the computing devices 110A-110C are configured with the IOS OPERATING SYSTEM. Other types of debugging client and server applications might be utilized when computing devices 110A-110C configured with other operating systems from other providers are utilized to test the operation of a program 108.

Through the configuration described above, data packets (e.g. requests to access a device locally connected to the developer computing device 106) generated by the debugging client application 130 executing on the developer computing device 106 are forwarded to the debugging server application 132 executing on the testing host 120. The debugging server application 132 can then communicate with a device 110 via the network connection 126 to the appropriate device host 114.

Through this configuration, peripheral devices accessible to the testing host 120 (e.g. device 110 that is physically connected to a device host 114) can be utilized by the developer computing device 106 for testing execution of the program 108 as if the device 110 was locally connected to the developer computing device 106. The program development environment 116 can then be utilized to cause testing frameworks to test the execution of the program 108 on the device 110. The output of the testing can be utilized for debugging the operation of the program 108 and, potentially, for other purposes.

In some embodiments, screen output generated by a device 110 used for testing can also be transmitted to the developer computing device 106, such as by way of a web socket, and displayed such as, for instance, within a web browser. Input (e.g. touch input) can also be made to the device 110 by way of the developer computing device 106 and forwarded to the device 110 for execution. Details regarding the transmission and utilization of screen output and user input can be found in U.S. patent Ser. No. 13/875,955, published on Nov. 6, 2014, which is entitled "Program Testing Service" and assigned to the assignee of the instant patent application, and which is expressly incorporated herein by reference in its entirety. Additional details regarding the operation of the developer computing device 106 and the program testing service 100 will be provided below with regard to FIGS. 2 and 3, respectively.

Figure 1B:
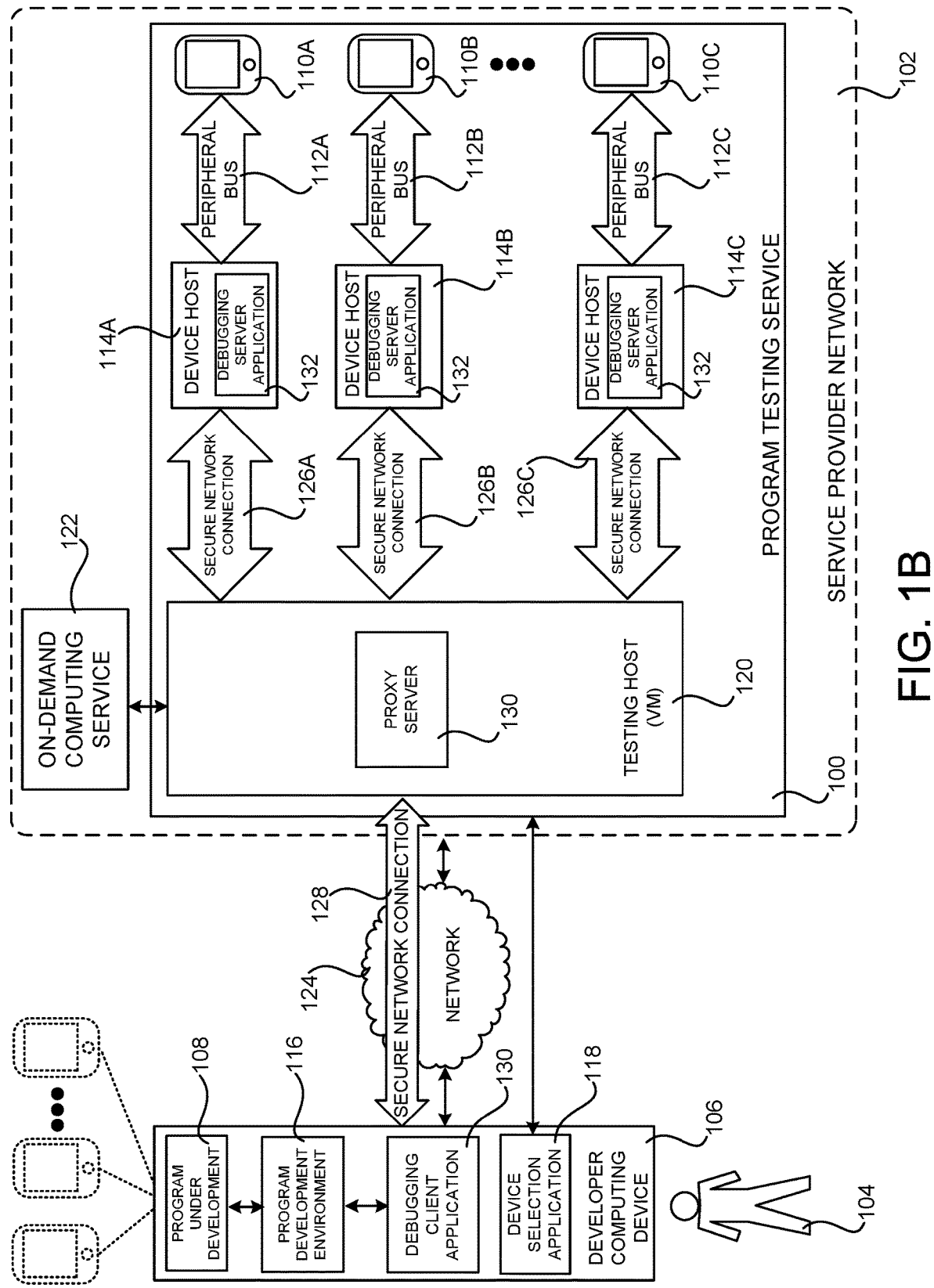
FIG. 1B is a system architecture diagram showing aspects of another configuration of the program testing service shown in FIG. 1A, according to one embodiment.

FIG. 1B is a system architecture diagram showing aspects of another configuration of the program testing service 100 shown in FIG. 1A, according to one embodiment. In the embodiment shown in FIG. 1A, the network connections 126A-126C utilize a secure network protocol, such as an SSH tunnel, rather than the peripheral bus over network protocol described above with regard to FIG. 1A. In this embodiment, a proxy server 130 is also executed on the testing host 120. The proxy server 130 receives requests for devices 110 from the debugging client application 130 and routes the requests to the proper device host. In order to provide this functionality, the testing host 120 can maintain a routing table for use in routing requests to the correct device 110.

In an embodiment where the devices 110 execute the ANDROID operating system, the proxy server 130 operates on port 5037, which is utilized by the ANDROID DEBUG BRIDGE. In this embodiment, the proxy server 130 receives requests from the debugging client application 130, determines the device 110 that the requests are intended for using the routing table, and routes the requests to the debugging server application 132 executing on the host 114 connected to the destination device 110. In an embodiment where the device 110 is an IOS device, the proxy server 130 performs similar functionality using USBMUXD.

Figure 2:
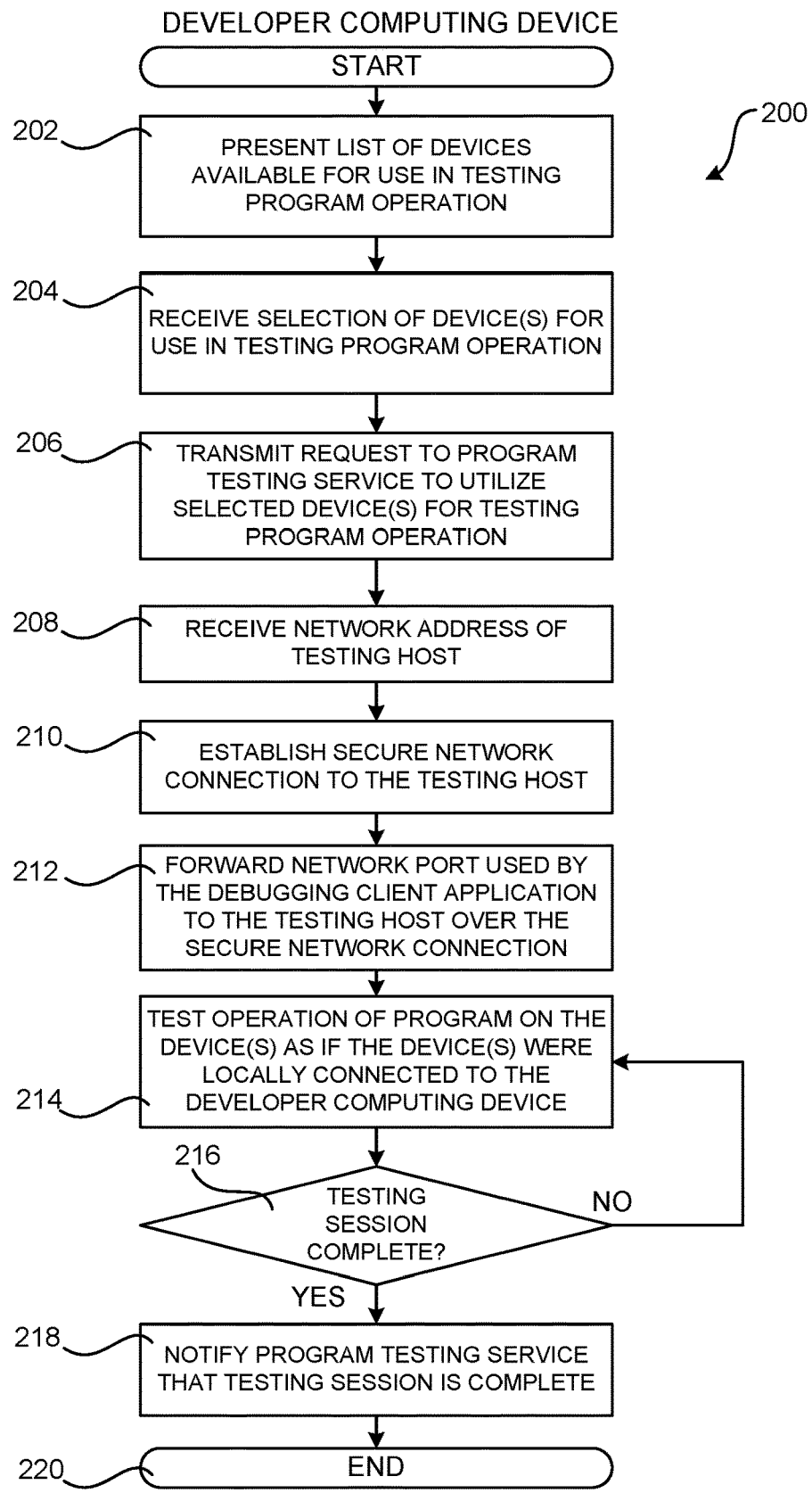
FIG. 2 is a flow diagram showing a routine that illustrates further aspects of the operation of a developer computing device that can be utilized with the program testing service of FIG. 1A, according to one embodiment.

FIG. 2 is a flow diagram showing a routine 200 that illustrates further aspects of the operation of the developer computing device 106 of FIG. 1A, according to one embodiment. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within a processor.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the device selection application 118 is executed on the developer computing device 106. As discussed above, the device selection application 118 can present a list of devices 110 that are available for use in testing the operation of a program 108. The routine 200 then proceeds to operation 204, where a developer 104 or other user can select one or more devices 110 from the list presented by the device selection application 118. The routine 200 then proceeds from operation 204 to operation 206.

At operation 206, the device selection application 118 transmits a request to the program testing service 100 to utilize the selected device 100, or devices 100, for testing of the program 108. As discussed above, the program testing service 100 can perform various functions in response to receiving such a request including, but not limited to, instantiating a VM to act as the testing host 120. In this embodiment, the program testing service 100 returns the network address of the testing host 120 to the device selection application 118. The device selection application 118 receives the network address at operation 208.

From operation 208, the routine 200 proceeds to operation 210, where the device selection application 118 establishes a secure network connection 128 with the testing host 120 at the specified network address. As discussed above, the secure network connection 128 is an SSH tunnel in one particular embodiment. Other types of secure network connections can be utilized in other embodiments.

From operation 210, the routine 200 proceeds to operation 212, where a network port used by the debugging client application 130 is forwarded to the testing host 120 via the secure network connection 128. Port number 5037 is forwarded in one embodiment. This port number is also opened on the testing host 120 so that the testing host 120 can receiving communications via the port. Other port numbers can be forwarded and utilized in a similar manner in other embodiments.

By forwarding the port in this manner, requests generated by the debugging client application 130 are forwarded to the debugging server application executing on the testing host 120. Through this configuration, the debugging client application 130 can communicate with devices 110 accessible to the testing host 120 (e.g. a device 110 that is physically connected to a device host 114).

The device 110 can then be utilized by the developer computing device 106 for testing execution of the program 108 as if the device 110 was locally connected thereto (devices 110 connected to the developer computing device 106 in this manner are represented using dashed lines in FIG. 1A). In particular, the program development environment 116 can then be utilized to cause testing frameworks to test the execution of the program 108 on the device 110. This occurs at operation 214. The output of this testing can be utilized for debugging the operation of the program 108 and, potentially, for other purposes.

From operation 214, the routine 200 proceeds to operation 216, where the device selection application 118 determines if testing using a device 110 has been completed. For example, the developer 104 might indicate that testing is completed through the UI provided by the device selection application 118. If testing has completed, the routine 200 proceeds from operation 218 to operation 220, where the device selection application 118 notifies the program testing service 100 that testing has completed. As described in detail below, the program testing service 110 might cause a VM implementing the testing host 120 to be destroyed in some embodiments. The routine 200 then proceeds from operation 218 to operation 220, where it ends.

Figure 3:
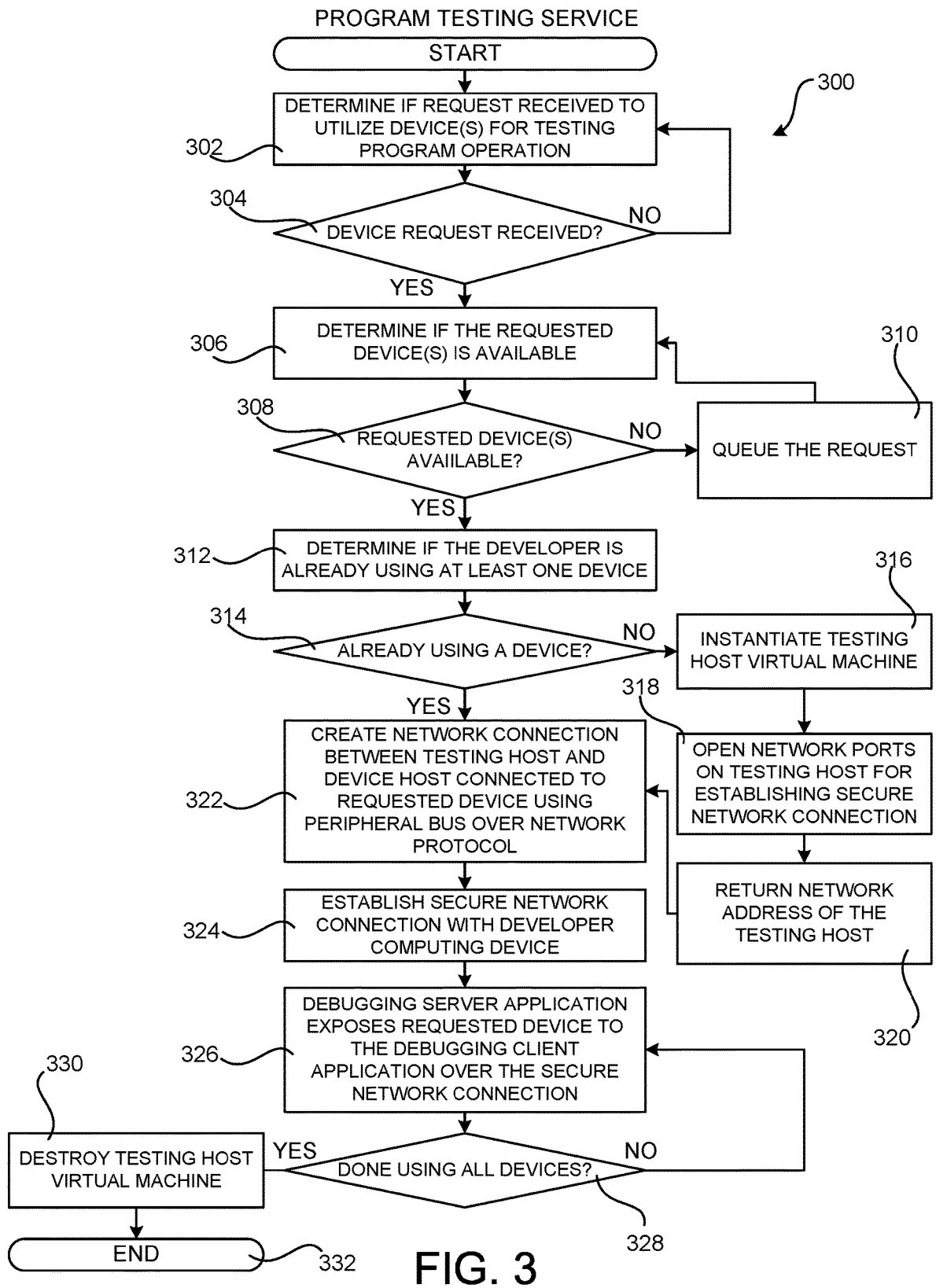
FIG. 3 is a flow diagram showing a routine that illustrates further aspects of the program testing service of FIG. 1A, according to one embodiment.

FIG. 3 is a flow diagram showing a routine 300 that illustrates further aspects of the operation of the program testing service 100 of FIG. 1A, according to one embodiment. The routine 300 begins at operation 302, where the program testing service 100 determines if a request has been received from a developer computing device 106 to utilize one or more of the devices 100 for testing.

If such a request has been received, the routine 300 proceeds from operation 304 to operation 306, where the program testing service 100 determines if the requested device 110 is available. If the requested device 110 is not available, the routine 300 proceeds from operation 308 to operation 310, where the request can be queued. If the requested device 110 is available, the routine 300 proceeds from operation 308 to operation 312.

At operation 312, the program testing service 100 determines if the requesting developer 104 is already using one of the devices 110A-110C for testing. If so, the same VM is utilized for testing on the newly requested VM. Accordingly, if the requesting developer 104 is not currently using a device 110 for testing, the routine 300 proceeds from operation 314 to operation 316.

At operation 316, the program testing service 100 utilizes the on-demand computing service 122 to instantiate a new VM to act as the testing host 120 in one configuration. Network ports can then be opened on the testing host 120 for communicating with the debugging client application 130 in the manner described above at operation 318. The routine 300 then proceeds to operation 320, where the network address of the testing hose 120 can be returned to the device selection application 118 in response to the original device request. The routine 300 then proceeds from operation 320 to operation 322.

If, at operation 314, it is determined that the developer 104 is already using a device 100 for testing, it is not necessary to instantiate a new VM to act as the testing host 120. Accordingly, in this case the routine 300 proceeds from operation 314 to operation 322. At operation 322, the testing host 120 creates a network connection 126 to the device host 114 that is physically connected to the device 110 requested for testing. As discussed above, the network connection 126 utilizes a peripheral bus over network protocol, such as USB/IP. This allows the device 110 connected to the device host 114 to appear as being local to the testing host 120.

From operation 322, the routine 300 proceeds to operation 324, where a secure network connection 128, such as an SSH tunnel, is established with the developer computing device 106 in the manner described above. The routine 300 then proceeds from operation 324 to operation 326, where the debugging server application 132 exposes the device 110 to the debugging client application 130 over the secure network connection 128.

The routine 300 then proceeds from operation 326 to operation 328, where the program testing service 100 determines if the developer 104 is done using the devices 110. If use of the devices 110 has completed, the routine 300 proceeds to operation 330, where the VM used to implement the testing host 120 is destroyed in one embodiment. The routine 300 then proceeds from operation 330 to operation 332, where it ends.

Figure 4:
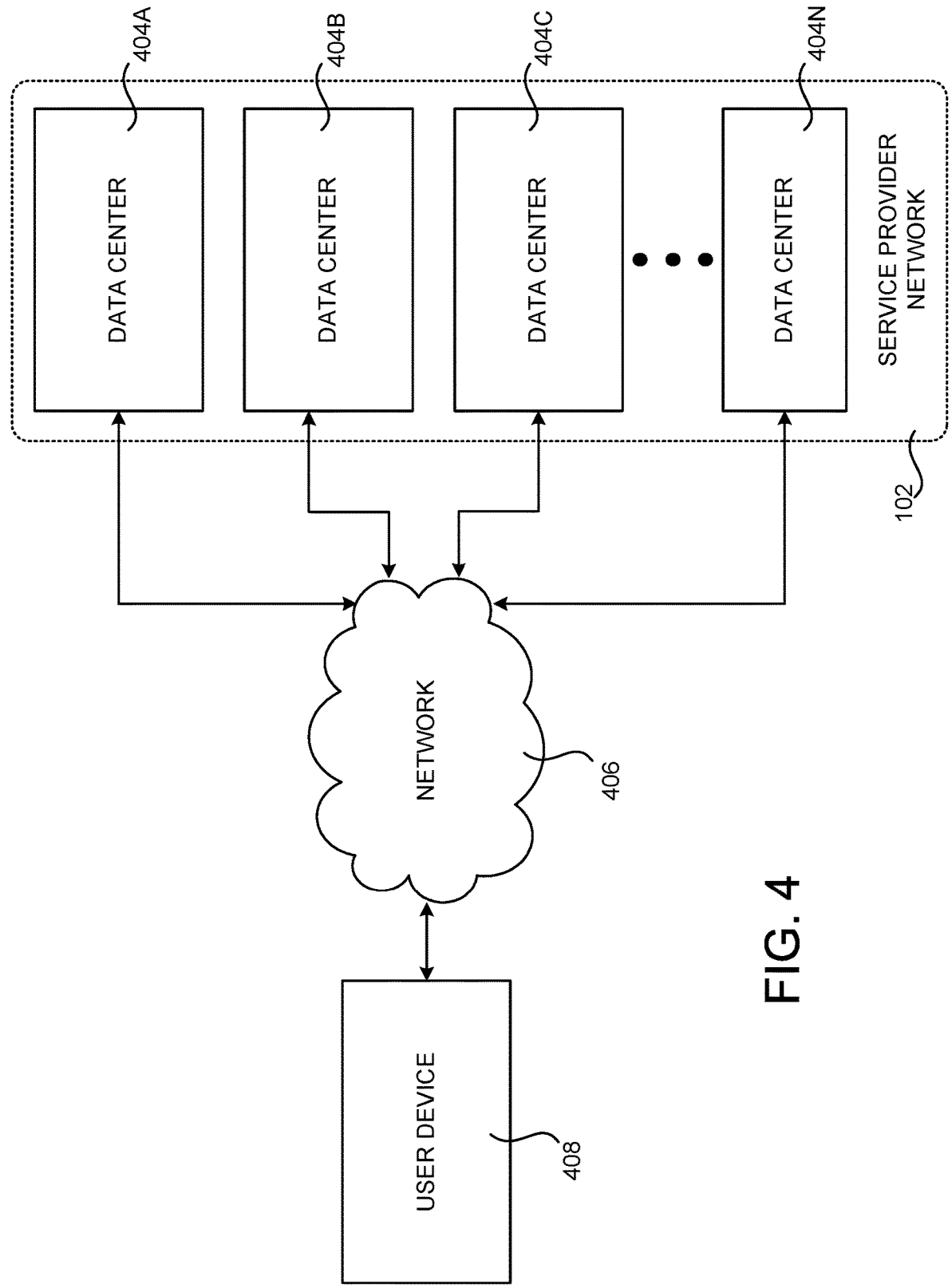
FIG. 4 is a computing system diagram that illustrates a configuration for a service provider network that can be utilized to implement aspects of the technologies disclosed herein.

FIG. 4 is a system and network diagram that shows aspects of a service provider network 402 that can provide computing resources for implementing the various technologies disclosed herein including, but not limited to the program testing service 100, which was described in detail above. The computing resources provided by the service provider network 402 can include various types of computing resources, such as data processing resources, data storage resources, networking resources, data communication resources, network services, and the like.

Each type of computing resource provided by the service provider network 402 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services described herein, and/or other types of programs. Data storage resources can include file storage devices, block storage devices, and the like. The service provider network 402 can also be configured to provide other types of resources and network services.

The computing resources provided by the service provider network 402 are enabled in one implementation by one or more data centers 404A-404N (which might be referred herein singularly as "a data center 404" or in the plural as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that implements some of the technologies disclosed herein will be described below with regard to FIG. 5.

Users of the service provider network 402, such as a user of the computing device 408 (e.g. the developer computing device 106), can access the various resources provided by the service provider network 402 over a network 406, which can be a wide area communication network ("WAN"), such as the Internet, an intranet or an Internet service provider ("ISP") network or a combination of such networks. For example, and without limitation, a user computing device 408 can be utilized to access the service provider network 402 by way of the network 406. It should be appreciated that a local-area network ("LAN"), the Internet, or any other networking topology known in the art that connects the data centers 404 to remote computers can also be utilized. It should also be appreciated that combinations of such networks can also be utilized.

Figure 5:
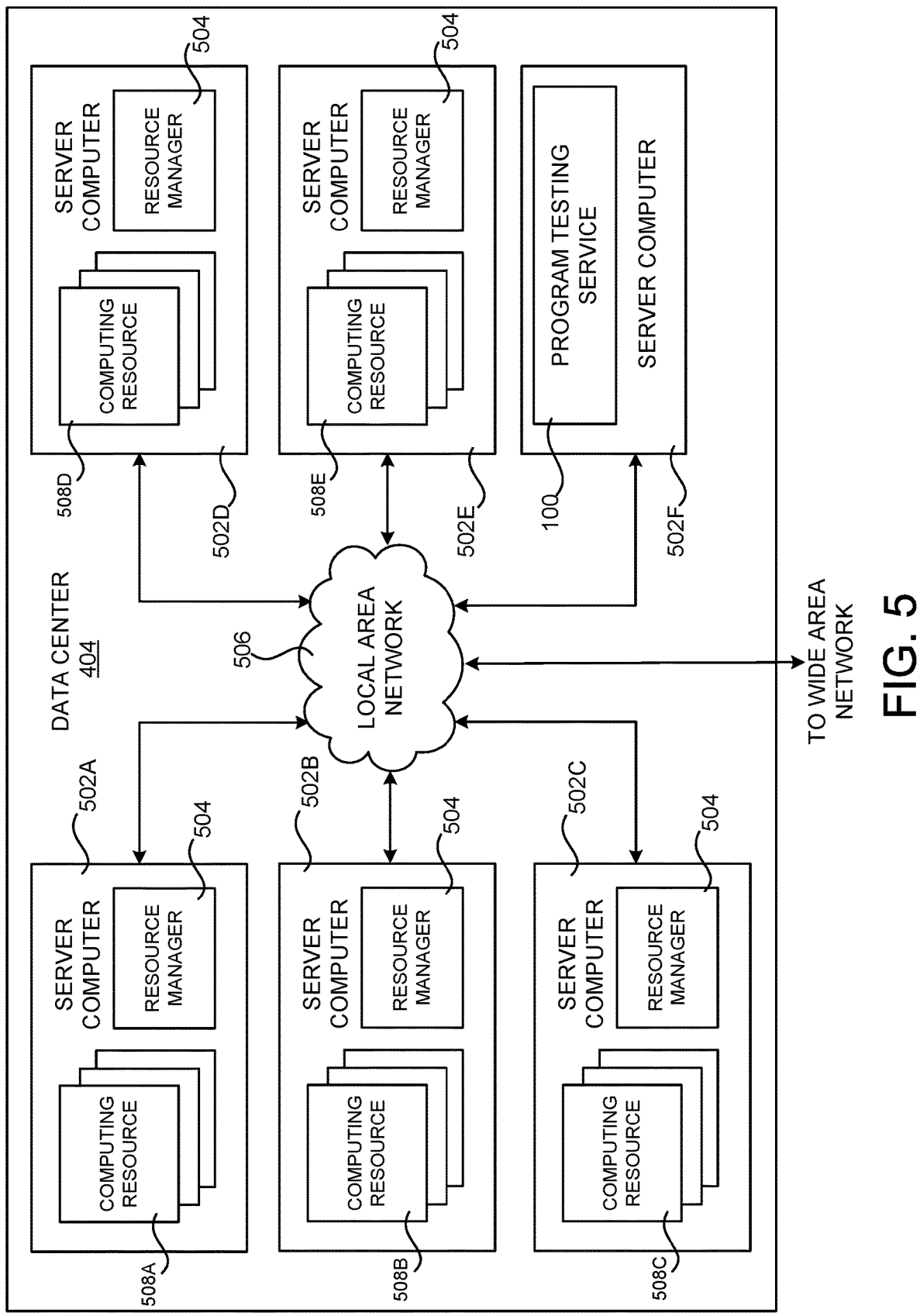
FIG. 5 is a computing system diagram that illustrates aspects of the configuration for a data center that can be utilized to implement aspects of the technologies disclosed herein.

FIG. 5 is a computing system diagram that illustrates one configuration for a data center 404 that can be utilized to implement the technologies disclosed herein. The example data center 404 shown in FIG. 5 includes several server computers 502A-502F (which might be referred to herein singularly as "a server computer 502" or in the plural as "the server computers 502") for providing computing resources 508A-508E.

The server computers 502 can be standard tower, rack-mount, or blade server computers configured appropriately for providing the computing resources 508. As mentioned above, the computing resources 508 can be data processing resources such as virtual machine instances or hardware computing systems, data storage resources, database resources, networking resources, and others. Some of the servers 502 can also be configured to execute a resource manager 504 capable of instantiating and/or managing the computing resources 508. In the case of virtual machine instances, for example, the resource manager 504 can be a hypervisor or another type of program configured to enable the execution of multiple virtual machine instances on a single server 502. Server computers 502 in the data center 504 can also be configured to provide network services and other types of services for supporting provision of the program testing service 100, and the related functionality described herein.

The data center 504 shown in FIG. 5 also includes a server computer 502F that can execute some or all of the software components described above. For example, and without limitation, the server computer 502F can be configured to execute software components for providing the program testing service 100. The server computer 502F can also be configured to execute other components and/or to store data for providing some or all of the functionality described herein. In this regard, it should be appreciated that the software components illustrated in FIG. 5 as executing on the server computer 502F can execute on many other physical or virtual servers in the data centers 504 in various embodiments.

In the example data center 504 shown in FIG. 5, an appropriate LAN 506 is also utilized to interconnect the server computers 502A-502F. The LAN 506 is also connected to the network 406 illustrated in FIG. 4. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504A-504N, between each of the server computers 502A-502F in each data center 504 and, potentially, between computing resources 508 in each of the data centers 504. It should also be appreciated that the configuration of the data center 404 described with reference to FIG. 5 is merely illustrative and that other implementations can be utilized.

Figure 6:
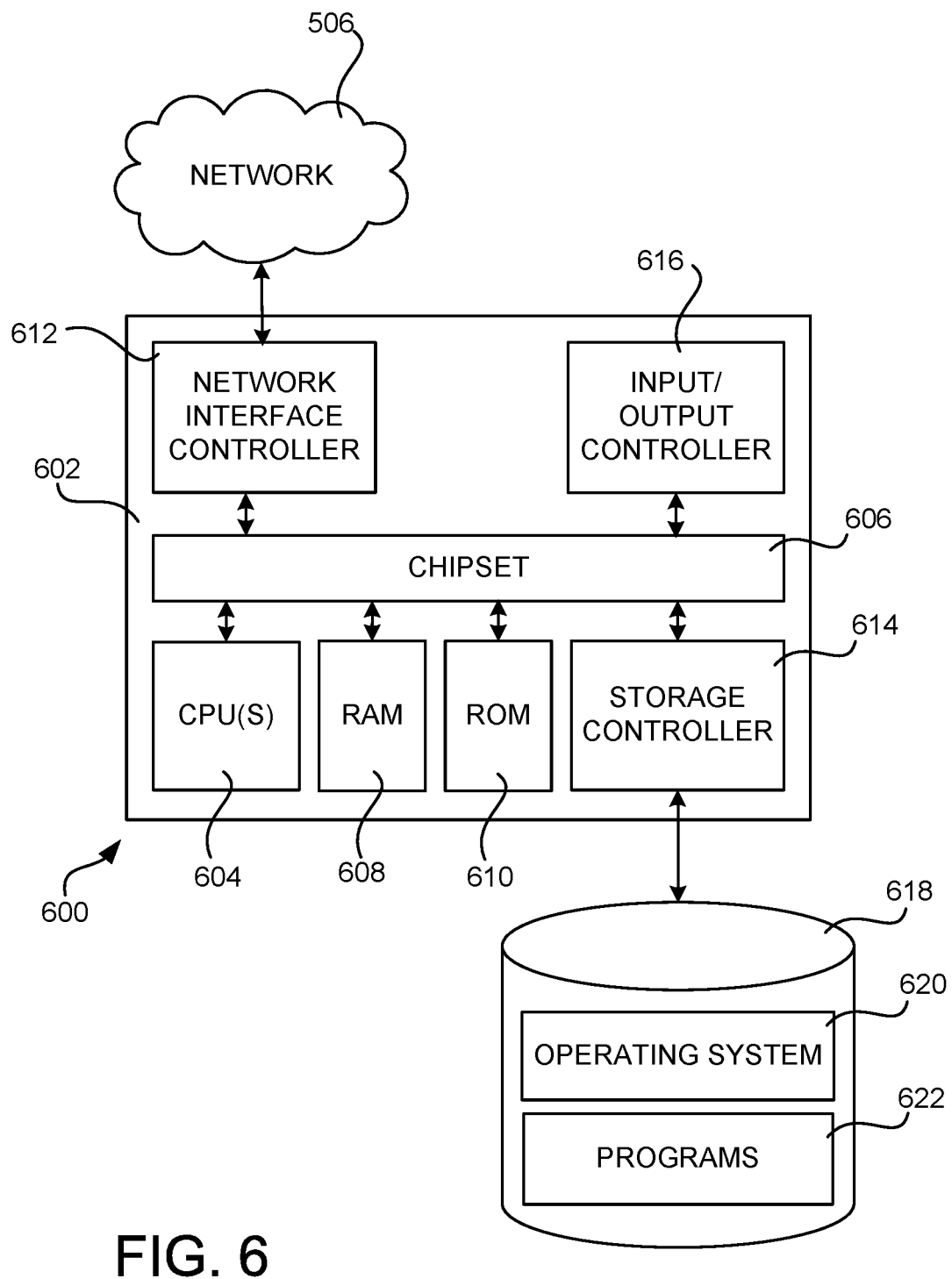
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing various aspects of the functionality described herein. The computer architecture shown in FIG. 6 illustrates a conventional server computer, workstation, desktop computer, laptop, tablet, network appliance, e-reader, smartphone, or other computing device, and can be utilized to execute any of the software components presented herein. For example, the computer architecture shown in FIG. 6 can be utilized to execute software components for providing the program testing service 100, and the related functionality described herein. The computer architecture shown in FIG. 6 can also be utilized to implement the developer computing device 106 and the devices 110.

The computer 600 includes a baseboard 602, or "motherboard," which is a printed circuit board to which a multitude of components or devices can be connected by way of a system bus or other electrical communication paths. In one illustrative embodiment, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the embodiments described herein.

The computer 600 can operate in a networked environment using logical connections to remote computing devices and computer systems through a network, such as the network 606. The chipset 606 can include functionality for providing network connectivity through a NIC 612, such as a gigabit Ethernet adapter. The NIC 612 is capable of connecting the computer 600 to other computing devices over the network 506. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, programs 622, and data, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. In one embodiment, the operating system 620 is the LINUX operating system. In another embodiment, the operating system 620 is the WINDOWS SERVER operating system from MICROSOFT CORPORATION. In other embodiments, the UNIX operating system or one of its variants can be utilized as the operating system 620. It should be appreciated that other operating systems can also be utilized. The mass storage device 618 can store other system or application programs and data utilized by the computer 600.

In one embodiment, the mass storage device 618 or other computer-readable storage media is encoded with computer-executable instructions which, when loaded into the computer 600 and executed, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described herein. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

It should be appreciated that technologies for providing a program testing service have been disclosed herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example embodiments and applications illustrated and described, and without departing from the true spirit and scope of the present invention, which is set forth in the following claims.

What is claimed is:

1. A system, comprising:
one or more processors; and
at least one non-transitory computer-readable storage medium storing instructions which, in response to being executed by the one or more processors, cause the system to:
receive a request from a developer computing device to utilize a first device for testing execution of an application on the first device, the first device connected to a host device in a service provider network by way of a peripheral bus;
responsive to the request,
instantiate a testing host virtual machine (VM) instance in the service provider network,
create a first network connection utilizing a USB/IP protocol between the testing host VM instance and the host device, based at least in part on the testing host VM instance being instantiated in the service provider network, wherein data packets from the peripheral bus are provided to the testing host VM instance on the host device by way of the first network connection,
establish a second network connection between the testing host VM instance and the developer computing device, and
cause data packets generated by a debugging client application executing on the developer computing device to be forwarded to a debugging server application executing on the testing host VM instance, whereby a program development environment executing on the developer computing device can utilize the first device as a device local to the developer computing device.

2. The system of claim 1, wherein the peripheral bus comprises a Universal Serial Bus (USB), and wherein the second network connection utilizes a secure shell (SSH) tunnel.

3. The system of claim 1, wherein the request comprises a first request, and the application comprises a first application,
wherein the instructions, in response to being executed by the one or more processors, further cause the system to receive a second request from the developer computing device to utilize a second device for testing execution of a second application on the second device.

4. The system of claim 1, wherein the data packets are generated by the debugging client application on a port number, wherein the data packets are forwarded on the port number to the debugging server application by way of the second network connection, wherein the debugging client application comprises an Android Debug Bridge (ADB) client, and wherein the debugging server application comprises an ADB server.

5. The system of claim 1, wherein the data packets are encapsulated into network payloads by the first network connection created based at least in part on the testing host VM instance being instantiated.

6. A non-transitory computer-readable storage medium having computer-executable instructions stored thereupon which, when executed by a computer, cause the computer to:
receive a request to utilize a first device for testing an application, the first device connected, by way of a peripheral bus, to a device host operating in a service provider network;
responsive to the request,
instantiate a testing host virtual machine (VM) instance in the service provider network,
cause a first network connection to be established with a first protocol based at least in part on the testing host VM instance being instantiated, the first network connection being established between the device host and the testing host VM instance operating in the service provider network,
cause a second network connection to be established with a second protocol based at least in part on the testing host VM instance being instantiated, the second network connection being established between the testing host VM instance and a developer computing device, the second protocol being different from the first protocol, and
cause requests destined for the first device from a debugging client application executing on the developer computing device to be routed through the first network connection and the second network connection to the first device.

7. The non-transitory computer-readable storage medium of claim 6, wherein the peripheral bus comprises a Universal Serial Bus (USB), wherein the first protocol is a peripheral-bus-over-network protocol, and wherein the second protocol is a secure shell (SSH) tunnel.

8. The non-transitory computer-readable storage medium of claim 6, wherein the request comprises a first request, and the application comprises a first application,
wherein the instructions, in response to being executed by the one or more processors, further cause the system to receive a second request from the developer computing device to utilize a second device for testing execution of a second application on the second device.

9. The non-transitory computer-readable storage medium of claim 6, wherein the debugging client application comprises an Android Debug Bridge (ADB) client application.

10. The non-transitory computer-readable storage medium of claim 6, wherein the debugging client application comprises a USBMUXD socket.

11. The non-transitory computer-readable storage medium of claim 6, storing further computer-executable instructions to execute a proxy server on the testing host VM instance to route the requests destined for the first device through the first network connection to the first device, wherein the proxy server performs functionality using USBMUXD to route the requests.

12. The non-transitory computer-readable storage medium of claim 6, wherein the requests from the debugging client application are generated on a network port number, and wherein the requests are forwarded to a debugging server application executing on the testing host VM instance using the network port number.

13. The non-transitory computer-readable storage medium of claim 6, storing further computer-executable instructions to cause a video output of the first device to be routed to the developer computing device.

14. A computer-implemented method, comprising:
providing a user interface (UI) on a developer computing device for selecting a first device in a service provider network for use in testing execution of an application;
receiving a selection of the first device through the UI;
responsive to receiving the selection,
instantiating a testing host virtual machine (VM) instance in the service provider network,
establishing a first network connection between the developer computing device and the testing host VM instance in the service provider network, establishing, based at least in part on the testing host VM instance being instantiated, a second network connection between the testing host VM instance and a device host that is connected to the first device by way of a peripheral bus, and forwarding requests from a debugging client application executing on the developer computing device to the testing host VM instance by way of the first network connection and to the first device by way of the second network connection and the peripheral bus.

15. The computer-implemented method of claim 14, wherein the second network connection comprises a secure shell (SSH) tunnel.

16. The computer-implemented method of claim 14, wherein the peripheral bus comprises a Universal Serial Bus (USB), and wherein the second network connection utilizes a peripheral-bus-over-network protocol.

17. The computer-implemented method of claim 14, wherein the first network connection comprises a secure shell (SSH) tunnel.

18. The computer-implemented method of claim 14, wherein the debugging client application is a USBMUXD socket, wherein the requests are forwarded to a debugging server application executing on the testing host VM instance, and wherein the debugging server application is a USBMUXD socket.

19. The computer-implemented method of claim 14, further comprising:

receiving, at the developer computing device, a first input directed to the first device and second input directed to a second device connected to the host device; and transmitting the first input to the first particular device and the second input to the second device.

20. The computer-implemented method of claim 14, further comprising:

generating the requests from the debugging client application executing on the developer computing device on a network port number, wherein forwarding requests from the debugging client application to the testing host VM instance by way of the first network connection comprises forwarding the requests from the debugging client application to the testing host VM instance by way of the first network connection to a debugging server application executing on the testing host VM instance using the network port number.

* * * * *